United States Patent
Friedman et al.

(10) Patent No.: US 6,393,581 B1
(45) Date of Patent: May 21, 2002

(54) RELIABLE TIME DELAY-CONSTRAINED CLUSTER COMPUTING

(75) Inventors: Roy Friedman, Haifa (IL); Kenneth P. Birman, Ithaca, NY (US); Srinivasan Keshav, Ithaca, NY (US); Werner Vogels, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/073,381

(22) Filed: May 6, 1998

Related U.S. Application Data

(63) Continuation-in-part of application No. 08/705,423, filed on Aug. 29, 1996, now Pat. No. 5,883,939.

(51) Int. Cl.[7] .................................................. G06F 11/16
(52) U.S. Cl. .............................. 714/4; 714/13; 709/239; 707/202
(58) Field of Search ....................... 714/4, 13; 370/217, 370/218, 221; 707/202, 3; 709/202, 239, 250

(56) References Cited

U.S. PATENT DOCUMENTS

| | | | |
|---|---|---|---|
| 4,455,645 A | 6/1984 | Mijioka et al. ............... 370/16 |
| 5,060,258 A | 10/1991 | Turner ......................... 379/134 |
| 5,084,816 A | 1/1992 | Boese et al. ................. 395/575 |
| 5,161,156 A | * 11/1992 | Baum et al. ..................... 371/7 |
| 5,235,700 A | 8/1993 | Alaiwan et al. ............. 395/575 |
| 5,384,783 A | 1/1995 | Satomi et al. ............... 371/9.1 |
| 5,386,467 A | 1/1995 | Ahmad ........................ 379/220 |
| 5,396,613 A | 3/1995 | Hollaar ........................ 395/575 |
| 5,404,508 A | 4/1995 | Konrad et al. .............. 395/600 |
| 5,450,578 A | 9/1995 | Mackenthum .......... 395/182.02 |
| 5,452,441 A | 9/1995 | Esposito et al. ........ 395/182.11 |
| 5,463,615 A | 10/1995 | Steinhorn ..................... 370/16 |
| 5,469,500 A | 11/1995 | Satter et al. ................. 379/201 |
| 5,473,771 A | 12/1995 | Burd et al. ............. 395/182.02 |
| 5,475,813 A | 12/1995 | Cieslak et al. .......... 395/182.02 |
| 5,521,971 A | 5/1996 | Key et al. .................... 379/220 |
| 5,526,492 A | 6/1996 | Ishida .................... 395/200.09 |
| 5,544,077 A | 8/1996 | Hershey ...................... 364/570 |
| 5,544,304 A | 8/1996 | Carlson et al. ......... 395/182.08 |
| 5,548,710 A | 8/1996 | Oono et al. .................. 395/181 |

(List continued on next page.)

OTHER PUBLICATIONS

IBM Technical Disclosure Bulletin, "Replication and Recovery of Database State Information in Fault Tolerant Clusters", Oct. 1993, vol. 36, issue 10, pp. 541–544.*

Cohen, Lawrence S., and Williams, John H., "Technical Description of the DECsafe Available Server Environment," Digital Technical Journal, vol. 7, No. 4, 1995, pp. 89–100.

Friedman, Roy, Birman, Ken, "Using Group Communication Technology to Implement a Reliable and Scalable Distributed IN Coprocessor," Dept. of Computer Science, Cornell University, downloaded from www://cs–tr.cs.cornell.edu, dated Aug. 30, 1996.

Primary Examiner—Scott T. Baderman
(74) Attorney, Agent, or Firm—Perkins, Smith & Cohen, LLP; Jacob N. Erlich; Jerry Cohen

(57) ABSTRACT

Apparatus and method of cluster computing are described. The present invention provides a useful compromise between the manageability, power, and ease of use of centralized systems and the reliability, fault-tolerance, upgradability, and scalability of distributed systems. Moreover, the present invention provides fault-tolerance and security while adhering to real-time to respond constraints or bounds. The invention is described in preferred embodiment examples in the context of two clustered applications: a telecommunication switch-controller and a Web servers, although many practical applications will benefit from the present invention.

23 Claims, 6 Drawing Sheets

U.S. PATENT DOCUMENTS

| | | |
|---|---|---|
| 5,574,770 A | 11/1996 | Yoo et al. ..................... 379/34 |
| 5,574,860 A | 11/1996 | Perlman et al. ........ 395/200.06 |
| 5,592,466 A | 1/1997 | Buczny et al. .............. 370/217 |
| 5,615,255 A | 3/1997 | Lemieux ..................... 379/230 |
| 5,621,884 A | 4/1997 | Beshears et al. ....... 395/182.08 |
| 5,636,341 A | 6/1997 | Matsushita et al. .... 395/182.11 |
| 5,675,723 A | 10/1997 | Ekrot et al. ............ 395/182.02 |
| 5,694,550 A * | 12/1997 | Takeda et al. ......... 395/200.11 |
| 5,754,752 A * | 5/1998 | Sheh et al. .................... 714/4 |
| 5,757,642 A * | 5/1998 | Jones ......................... 364/134 |
| 5,796,934 A * | 8/1998 | Bhanot et al. ................. 714/4 |
| 5,883,939 A * | 3/1999 | Friedman et al. .............. 379/9 |

* cited by examiner

RELIABLE TIME DELAY-CONSTRAINED CLUSTER COMPUTING

CROSS REFERENCE TO RELATED APPLICATIONS

The present application is a continuation in part of U.S. patent application Ser. No. 08/705,423, which is now U.S. Pat. No. 5,883,939 entitled DISTRIBUTED ARCHITECTURE FOR AN INTELLIGENT NE Aug. 29, 1996 of common assignment with the present application. A PCT application based upon Ser. No. 08/705,423 was filed on Aug. 28, 1997 and given PCT Ser. No. PCT/US97/15207.

STATEMENT OF GOVERNMENT INTEREST

This invention was made with Government support by DARPA/ONR under Grant No. N00014-96-1-1014 awarded by DARPA/ONR. The Government has certain rights in the invention.

FIELD OF THE INVENTION

The present invention relates generally to distributed or cluster computing systems and processes. More particularly, the present invention relates to fault tolerant, scaleable, cluster computing systems and processes operating within given time constraints.

BACKGROUND OF THE INVENTION

Cluster computing represents a compromise between the manageability, power, and ease of use of centralized uniprocessor systems and the reliability, fault-tolerance, and scalability of distributed systems. A cluster comprises a set of workstations or personal computers connected by a high-speed local area network. Thus, a cluster replaces a uniprocessor with a set of commodity computers meshed by a software backplane (that is, the logical software equivalent of a wired backplane wherein all the electronic printed circuit cards or modules are interconnected). A cluster is almost as easy to manage as a uniprocessor because all the members of the cluster are homogeneous and centrally administered. Moreover, it is easy to use because a cluster appears to users as a single powerful computer with a single file system and a single set of applications. Nevertheless, being a distributed system, a cluster offers the power, scalability, reliability, upgradability and fault-tolerance characteristic of such distributed systems. These characteristics give clusters a great advantage-over uniprocessor systems.

While cluster computing systems and methods are known, they generally lack the ability to meet time to response bounds.

Providing both fault tolerance and guaranteed completion time properties simultaneously is not trivial. The traditional approach to fault tolerance is to use a tightly coupled hardware based fault-tolerant computer systems, such as the ones manufactured by Stratus™ and Tandem™. The hardware approach suffers from at least three substantial problems. First, although this approach allows transparent masking of hardware faults, the system cannot tolerate software failures, which remain a source of downtime in many critical settings. Second, administrators cannot perform 'hot' (upgrading while the system is running) upgrades to software or hardware on such systems. Third, fault-tolerant hardware often lags the price/performance curve of commodity computers by several years.

The above tightly coupled hardware fault-tolerant computers have an advantage, however, of preserving the response characteristics of applications executed upon them. If an application is designed to respond to some class of requests within a time bound, for example 100 ms, a tightly coupled hardware based fault-tolerant platform will preserve that response time. In contrast, prior art distributed cluster fault-tolerance solutions are slow to respond-in general, and such systems are often slow to detect and react to failures, so that they rarely meet time bounds, especially in the presence of failures. For example, a classical solution would be to require applications to execute a Byzantine agreement protocol (highly complex and redundant) to mask software faults, imposing a significant computational and communication burden on the cluster.

Another limitation of prior art systems is their inability to scale to accommodate larger numbers of networked computers (QE's). These networked computers are used in conjuction with an External Adaptor (EA), or front end computer, which connects to an external communications network on one side and the networked computers in parallel (either by a bus or separate communication lines) on the other side. Scaling is important since the telecommunications industry hopes to build memory-mapped databases containing hundreds of millions of subscriber records. This scalability limitation is illustrated for example in cluster systems implementing a telephone switching (SS7) protocol where external requests are to be uniformly distributed among the QE's. The EA handles incoming requests that are batched (if large numbers of requests are received) for processing at the QE's. Thus, the workload on the EA rises in direct proportion to the number of QE's. When a protocol, like SS7, is implemented timing restrictions apply. In such an instance, these timing requirements act to limit the number of QE's that can be handled by an EA to 8 to 12 QE's, where handling fifty or more QE's may be required.

Herein, and in the art, several terms are used interchangeably. The "cluster" refers to the entire distributed computing system connected to a external communications network, e.g. the Internet, an Ethernet. Cluster will be the term of choice. The parts of the cluster that connect directly to the external communications network are called. the "front end", or the external adaptors, or EA computers or EA's . Hereinafter, EA will be the term of choice. The part of the cluster that performs the computation and other tasks, is referred to as the "back end", or the networked computers, or the query elements, or QE computers, or QE's. Hereinafter, QE will be the term of choice. Another term, "time-delay constrained," is interchangeable with "time delay bound," "time to respond", and other combinations, but the meaning of the terms will be clear from the context to those skilled in the art.

Herein, alternate terms listed above may be used, or other terms, such as "group" may be used, wherein such use will be clear from the context.

It is therefore an object of the present invention to provide a cluster computing system and method that is fault tolerant.

It is another object of the present invention to retain the advantages of cluster computing, while gaining the fault-tolerance and timely responsiveness of a uniprocessor and/or hardware system solution.

It is yet another object of the present invention to provide a fault tolerant cluster computing system and method that completes a response or computation even if one or more of the components of a cluster fails.

It is still another object of the present invention to provide a fault tolerant system and method that is scaleable.

SUMMARY OF THE INVENTION

The present invention meets the foregoing objects in apparatuses and methods for designing practical, reliable, time delay-constrained (time bound) cluster computing systems, in which a limited number of EA's (typically two) interact with the external, outside world, directing clients requests to the QE's, and then relaying the replies back from the QE's to the clients.

Cluster computing is naturally suited to systems that perform large numbers of independent (or nearly independent) small computations. The cluster is partitioned into one or more EA's and multiple QE's. The EA isolate and hide the rest of the cluster from the external network and provide load balancing. Fault-tolerance requires replication of EA functionality.

In a preferred embodiment of the invention, a client computer contacts one of the EA's with a request via a communications network. The EA forwards the request to one of the QE's where a reply is generated for sending back to the client via the EA. The QE selected is determined by: the capabilities of computers that comprise the QE's, the current load distribution on the QE's, and the expected time bound for handling the request. With a reliable time delay-bound cluster, the reply is generated within a time delay bound despite failures in the computers comprising the EA's and the QE's.

In another preferred embodiment of the present invention, the EA's communicate with the outside world, with each other and with the QE's. Also means are provided for the QE's to communicate with each other. In this embodiment, the QE's are logically divided (that is the QE's are not physically separated) into at least two sets of lists—one set of lists for each EA. A list is a grouping of a number of QE's. Each of the lists within a set is non-overlapping within that set such that each QE appears only in one list within a set of lists. The sets of lists are arranged such that, when comparing a list from one set with a list from the other set, the overlap contains at most one QE. This arrangement provides at least two logically distinct routing paths between the EA's and every QE.

In another preferred embodiment the lists are selected by calculating the closest integer square root above and below the number of QE's. For example, with two EA's and twenty QE's, the closest integer square root below twenty is four (the square being sixteen), and the closest integer square root above twenty is five (the square being twenty-five), thus bracketing twenty. The result is that the twenty QE's are divided into two sets of lists. One set has four lists with five QE's in each list and the other has five lists of four QE's in each list. However, in other preferred embodiments, some overlapping among the lists may be used.

Four specific aspects of designing such clusters are addressed by the present invention and preferred embodiments thereof by: a) providing bounded response time in the presence of failures, b) achieving high-throughput, c) scalability, and d) managing the cluster. Cluster management is accomplished by communicating with the cluster—EA's and QE's, as a whole (group communication). This group communication keeps track of membership changes (new and/or discontinued EA's and QE's), detects failures in the cluster, and automatically reconfigures the system when new QE's or EA's are added. However, in order to maintain good performance, group communication is used only for control messages, and is kept out of the time delay bound path of the request and reply messages. Time delay bound response is achieved by using a primary-backup approach, in which the backup is activated after half of the allowed time has expired without a reply rather than waiting for the system to detect the failure. In order to implement this primary/backup approach, there are at least two EA's, with one backing up the other. In a similar manner if a QE does not respond in half the allowed time, the EA will send the request to another QE.

An advantage of the present invention is based on the observation that, in prior art clusters, the EA's can be a bottle-neck to adding (scaling up) QE's to clusters due to the overhead associated with the use of many QE's. The present invention achieves high-throughput and scalability by combining message batching techniques with data dissemination algorithms that push some of the communication overhead from the EA's to the QE's.

A further advantage of the present invention is the ability to meet a time-to-respond requirement in the presence of one or more cluster component failures. The present invention substantially guarantees the completion time of replies to requests, even in the presence of failures.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
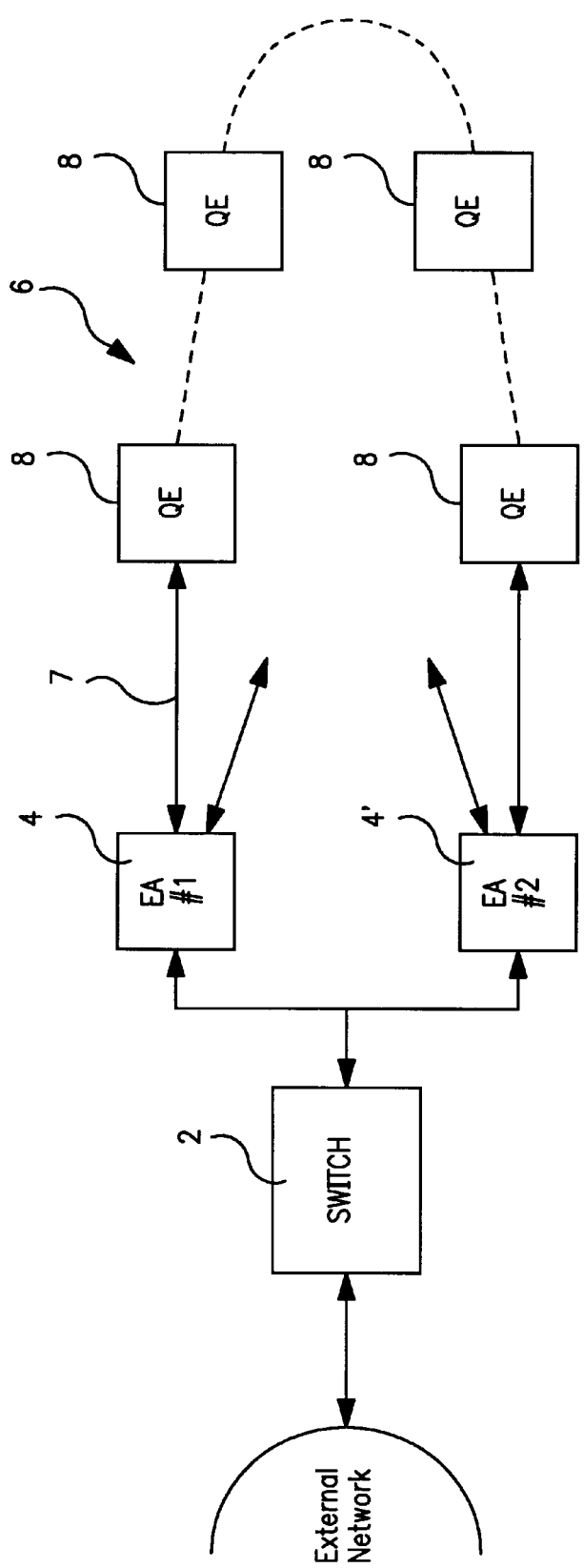
FIG. 1 is a block diagram of a physical interconnection of QE's and EA's in accordance with the present invention.

In order to better understand the present invention it is necessary to understand applications where the invention can be utilized to advantage. Some of these applications are as follows:

Bulk encryption and decryption: Electronic commerce has become widespread on the Internet. Secure communication on the Internet requires encryption of content. Electronic commerce servers therefore require the capability of performing tens of thousands of encryptions and decryptions per second. A reliable time delay-constrained cluster ensures that customers obtain consistently fast response time. In this application, the cluster is placed in a physically secure location, so that communication between cluster elements is secure. Encryption and decryption requests are sent to an EA that routes these to QE's. With the fault tolerant techniques described herein, the user is assured of a cluster where encryption/decryption will succeed in the time bound, even when some cluster elements have failed.

Web server: (described in more detail below) A Web server processes HTML commands to provide access to information stored in a repository. In a cluster applied to this architecture, QE's store mutually overlapping subsets of the repository. Incoming requests are directed by one of the EA's to one of the QE's depending on what is stored at each QE and the QE's current load.

The present invention ensures uninterrupted web service if either the EA's or QE's fail while processing a request.

Switch-control: (described in more detail below) A switch-controller in a telephone or ATM network processes incoming signaling messages to manage a switch. For example, a call setup message results in allocation of a temporary connection block, and a call setup reply results in modification of the switch forwarding table. Calls can be processed independently by back end (QE's) machines as long as the QE's agree on the current level of resource utilization in the switch, so that admission control decisions ( a term of art) are consistent. In a cluster switch controller, incoming signaling messages arrive at the front end machines (EA's ) and are distributed to back end (QE's) machines. The QE's do all the processing except for making an admission control decision. This is done at the front end, to guarantee consistency. The present invention ensures that the message processing will be completed within a given deadline, typically 100 ms.

Stable storage: A stable storage system assures that a file, once written, is always available, despite system crashes and/or disk failures. To implement stable storage with a cluster architecture, an EA maps files (or blocks) to a set of QE's. Write requests are multicast to the set and read requests are satisfied by any QE of the set that is available. Versioning techniques are used to recover quickly from QE restarts. Briefly, when a QE recovers, it does not attempt to regain a consistent state. On a read, the EA gets version numbers from its entire read set. If a QE has an older version of a file, it is updated in the background from the QE that holds the latest version. This lazy update minimizes traffic bursts during recovery. The present invention, a reliable, time delay-constrained cluster, ensures a time bound on read and write times, which is important for continuous media and electronic commerce applications.

Name service: A name server translates an alphabet string representing a name to a numeric identifier. Name resolution is simple if the translation is available locally at the name server, either because the local copy is the authoritative one, or because of a previously cached result. However, resolving non-local names is expensive both in terms of computation and communication latency. Moreover, fault-tolerance in name service is critical in building reliable applications over the Internet. The present invention provides reliable time delay-constrained clusters which facilitate a scaleable, fault tolerant name server with consistent performance. Name resolution requests arrive at an EA, where they are looked up in a local cache. If the lookup succeeds, the EA returns the translation. Otherwise, the resolution process is forwarded to one of the QE's for further processing.

These above application examples indicate the need and the advantages of the present invention as applied to practical systems. The present invention is not limited to these above applications and can be used to advantage in other applications. However, the present invention, in the above practical applications, demonstrates clear advantages over the prior art. For example:

1) on detecting a QE failure to respond, the EA simply reissues the request to another QE.
2) some applications require the QE's to share their states of operation with each other and the EA's . For example, in the name service example above, QE's should know which names have already been resolved. By sharing of QE state information including the already resolved names with the EA's, the EA's can partially process subsequent name requests that have already been resolved thus increasing efficiency and reducing time to respond delays. For example, the first level of name lookup may be accomplished at the EA, which knows about all resolved names by the QE's sharing their state information. This reduces the need to send the request to the QE's.
3) an EA represents a single point of failure and therefore must be replicated for fault tolerance. However, this causes problems when dealing with sharing the state information of the cluster. Consider again the name service example that supports two EA's . On resolving a name, both must be updated. Moreover, each EA must watch the other so that requests are handed over to the backup EA correctly when one EA fails. These synchronization mechanisms are described in more detail below.

The invention will now be described in detail with reference to the following two examples which were briefly described above and described in greater detail below; that is, a telecommunications switch and a Web-server. In addition, in order to fully understand this description, the following assumptions have been made:

(a) the physical interconnections among the EA's and QE's are fault free and never fail. This can be substantially implemented by dual connecting all the QE's and the EA's with two physically separate networks.
(b) a computation can be performed, under reasonable loads, within its time delay bound.
(c) the delay across the network is insignificantly small compared to the time to respond requirement. Note that ATM, Myrinet, and the fast interconnect of the IBM SP2 meet this requirement. Even fast switched Ethernet performs in this manner when not overloaded.
(d) limited communication among back end computers need occur in satisfying the request. This assumption is valid for applications which tend to be "read intensive." However, this limitation is minimized or relieved if sufficient hardware/software resources are available to the QE's.
(e) requests are relatively stateless, so that repeated requests from the same client can be sent to different QE's with little or no transfer of per-client state. This is satisfied in the case where inquiries greatly outnumber writes in the targeted applications. This assumption may be true for updates where writes are required. For example, billing in telecommunication switches is performed off-line, based on the charges collected during the previous day. In this case, a simple duplicate suppressing technique can be used to eliminate duplicate charges that might have resulted from an EA that issues a request to one QE and then reissued the request to another QE.

Further, although the present invention is described with reference to the following examples, it should be noted that the invention is not limited to the examples provided herein.

EXAMPLE 1—TELECOMMUNICATIONS SWITCH

This example as set forth below describes in more detail the use of the invention in a switch-control application described briefly above. This particular application is shown in FIG. 1, which is a block diagram of a telecommunication switch able to sustain and support loads of up to 20,000 requests per second even in the presence of QE crashes, with up to 50 or more QE's. This preferred embodiment focuses on designing a cluster for processing Signaling System 7 (SS7) messages over a telephone network. This application of the SS7 protocol suite is both well-defined and well-matched to cluster distributed computing architecture. An example of implementing the SS7 protocol is described in detail in the parent application, Ser. No. 08/705,423, of which this application is a continuation-in-part, and will therefore only be outlined herein.

As shown in FIG. 1, the cluster functions as an intelligent network co-processor, handling call routing for an SS7-compatible switch 2. The switch 2 communicates with the cluster through a dual TCP (transfer control protocol) connection, each handled by an external adapter 4 (EA#1) and 4' (EA#2). Each EA routes requests to an appropriate query element (QE) 8 within the networked computers 6 comprised of QE's. These EA's are responsible for load balancing, fault-tolerance, and for obtaining a response within the 100 ms deadline established by the SS7 architecture. Sets of QE's 8 replicate data needed to handle various classes of telephone calls using standard group communication system tools. In this example, the call identification information, which includes origin and destination telephone numbers and billing data, is adequate to select an appropriate QE to handle the call. In FIG. 1, there is shown a separate physical communication line 7 between the EA's and the QE's. This line 7 is a redundant line to ensure fault tolerance in case of an interconnection failure.

In this example, an architecture incorporating batching and requiring a response within half of the required time delay bound (also called rapid turnover) was used. With batching, requests and replies designated to the same QE or EA are sent periodically in one aggregated message, instead of generating a separate message for each request or reply. A batching interval of 15 ms was selected for this embodiment. Fifteen milliseconds (15 ms) is the longest allowed delay time given the expected mean query processing times in real telecommunications applications and with the requirement to meet the 100 ms delay constraint.

During operation, the primary EA (the other EA is the backup) dispatches a request to a corresponding QE. If there was no response from the QE, the backup EA reissues the request to a second QE after 50 ms, that is, after half the deadline. Assuming requests carry a unique id, one EA is designated as the primary EA for requests from even number ids, and the second EA the primary for odd numbers. The system does not wait for a positive detection of a failure.

With these refinements, and by coding the critical communication path carefully, and using a very low latency, high throughput communication stack, a steady throughput of 20,000 requests per second was achieved with the present invention. Moreover, 99.9% of requests were completed within the 100 ms response time requirement even if QE's crashed and were restarted. The 0.1% of the requests that timed out by exceeding 100 ms were randomly distributed and would not count towards downtime in the SS7 architecture.

The present invention in general, and as applied to EXAMPLE 1 above, implements a token-based scheme that allows scaling of the architecture to accommodate a much larger numbers of QE's.

Figure 2:
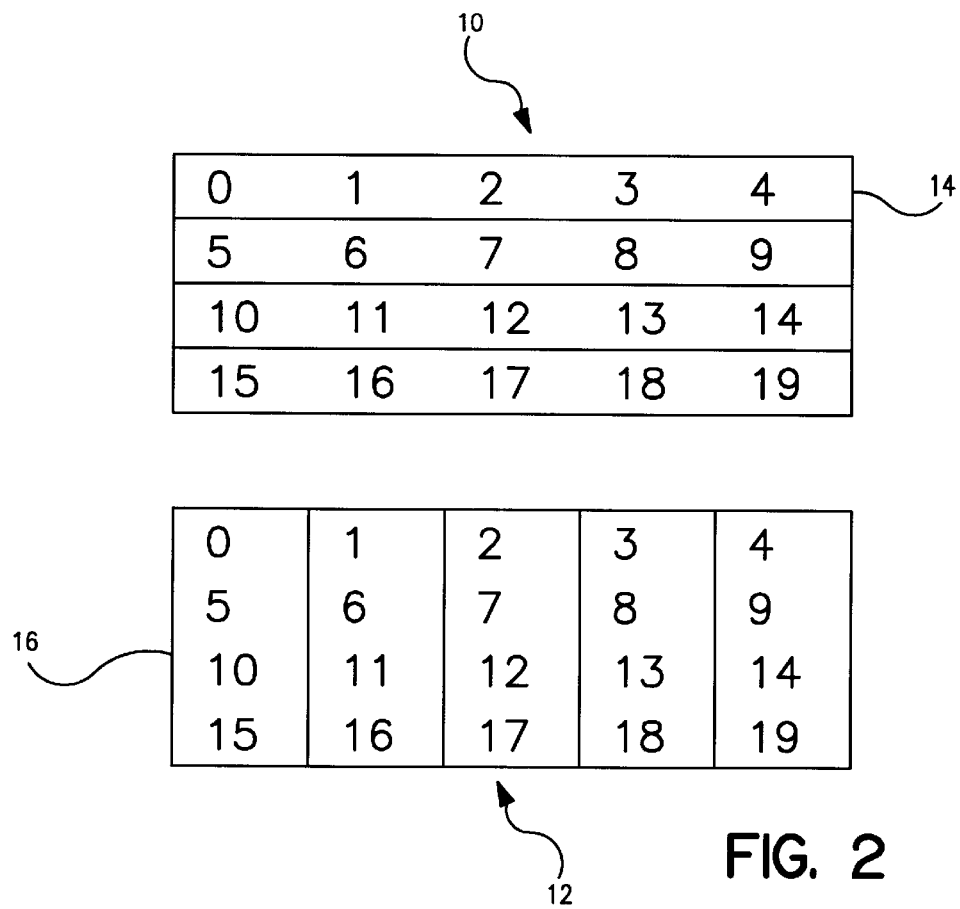
FIG. 2 is a table of two sets of non-overlapping lists of QE's in accordance with the present invention.

In one preferred embodiment, each EA logically divides the group of QE's into two sets of lists. In each set, the lists are non overlapping, such that a QE appears in only one list in each set. Referring to FIG. 2, if there were twenty QE's, one set 10 shows the twenty arranged as four lists with five QE's in each list. For example, the first list 14 has the first five QE's (QE's 0–4).

In the second set 12 of lists, the twenty QE's are arranged as five lists with four QE's in each list. For example, the first list 16 of the second set contains QE's 0, 5, 10, and 15.

Notice that in each set, each QE is in only one list- the lists do not overlap. Notice also, that when a list from the first set is overlaid onto a list from the second only one QE is common to such an overlay. These sets of lists are used for routing messages that guarantees that there will be at least two distinct paths between every EA and every QE.

The determination of the number of lists and the number of QE's in each list, in a preferred embodiment where two sets of lists are to be determined, is accomplished by bracketing the total number of QE's and calculating the nearest perfect squares next above and next below that number. As described earlier, if the number of QE's is twenty, the nearest perfect square above twenty is twenty-five and the nearest below is sixteen. The square roots of these perfect squares are five and four, respectively. Therefore the sets are arranged as one set 10 of four lists with five QE's in each list, and the other set 12 has five lists with four QE's in each list. FIG. 2 shows such an arrangement.

In EXAMPLE 1, for every list, every 15 ms each EA collects all requests that should be forwarded to all QE's in that list, and sends the aggregated requests in one message to the first QE in the list. When the first QE receives the message, it removes the requests that are designated for it, adds the replies that it needs to send to the EA that originated the message, and forwards the result to the next QE. The last QE forwards the aggregated replies to the EA that initiated the message. Thus, QE's not only handle queries, but also perform a rudimentary form of message routing, thereby relieving the EA's of some work.

Figure 3:
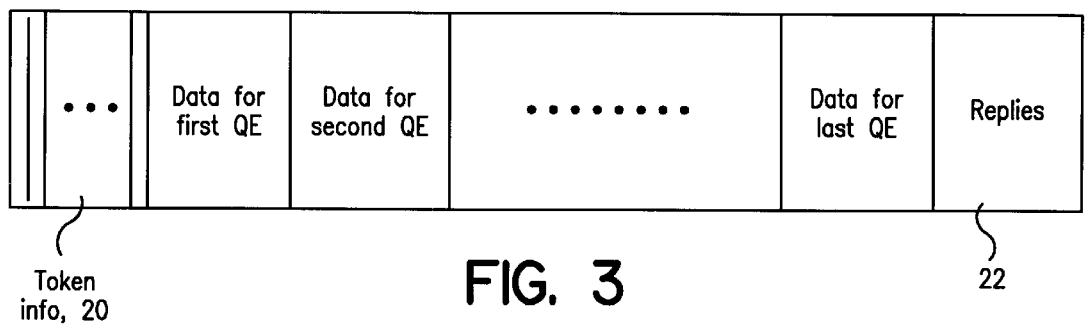
FIG. 3 is a layout of the contents of a typical message in accordance with the present invention.

FIG. 3 shows a preferred message structure. Initially, the EA inserts the requests into the message such that all requests designated to a single QE are ordered in one continuous data stream. Also, at the beginning of the message, the EA pushes a list of "token" structures 20. Each token structure consists of two fields, the id of a QE and the number of bytes headed for that QE. When a message is received by a QE, it pops the list of tokens in order. In this implementation a message is "pushed" onto a stack (usually consecutive memory locations logically configured as a "stack" upon which when data is written it is called a "push", and when read called a "pop") and the the token list is pushed onto the same stack. From the token information, the QE then reads its share of the message according to the token information, and adds its replies 22 for the EA to the end of the message. Finally, it restores the token list for the remaining QE's by pushing the rest of the token list at the front of the message, and send the message to the next QE indicated by the tokens list. This structure guarantees minimal copying. That is, the only copying taken place is when the message arrives from the network, and then when it is pushed back to the network.

This token ring type architecture provides a scaling allowing a cluster to handle fifty to one hundred QE's networked together. A network of fifty QE's may provide an aggregate of 3,300 MIPS computing power, and accommodate a maximum of 50 GB of memory. (The number is actually 100 GB, but to ensure fault-tolerance, each data entry must be held by at least two computers that comprise a QE). In contrast, a top of the line fault-tolerant SMP, the Stratus Continuum model 1245, has a maximum performance of 288 MIPS and is limited to 1 GB of memory.

EXAMPLE 2—WEB SERVER

This example describes in more detail the use of the invention in a typical database Web server. The Web server maintains TCP (transfer control protocol) connections over a communications network such as the Internet to their client computers. In these cases, the client starts by establishing a TCP connection, which is then used for one or more requests. To provide transparent fault tolerance, an EA or QE failure must not impact this TCP connection or disturb the TCP protocol itself, since the option of changing the TCP protocol stack in the client is clearly not available since the client is remote. The present example describes a preferred embodiment of a scaleable and fault-tolerant Web server, accessible over a standard TCP-connection and running the standard HTTP protocols.

Figure 4:
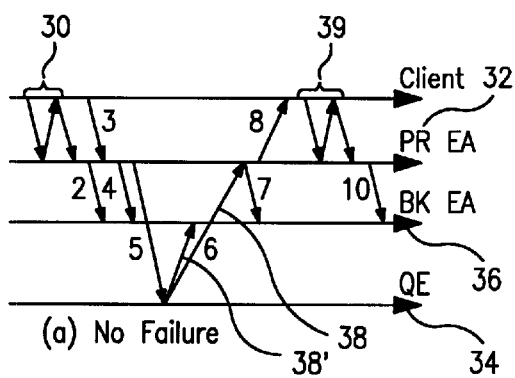
FIG. 4 is a timing chart in accordance with the present invention.

The direct application of the architecture of FIG. 1 to a Web server uncovers the issue of how to propagate the incoming requests to the QE's and back, without changing the code of the TCP implementation. In EXAMPLE 2, as shown in FIG. 4, a client forms a TCP 30 connection with one of the EA's, whose IP address can be retrieved from the Domain Name Service, "DNS", that is a standard service that translates names (URLs). That EA is the primary EA 32 for this particular TCP connection. The primary EA 32 then forwards the request to both the chosen QE 34 and the backup EA 36. After handling a request, QE 34 sends the corresponding reply to both EA's, 38 and 38'. At this point, the primary EA 32, which holds the TCP connection, forwards the reply to the client. The connection is terminated by the client 39. Since the combination of a source IP address, source port, destination IP address, and destination port uniquely identifies a TCP connection, this information is placed as a header on all internal communications within the distributed server, i.e., on the messages sent between the EA's and QE's. Sharing this information is key to a fault tolerant system.

Figure 5:
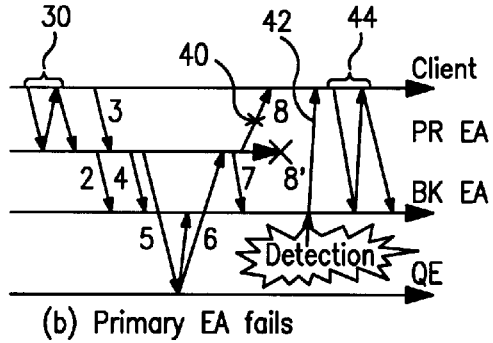
FIG. 5 is another timing chart in accordance with the present invention.

FIG. 5 depicts a scenario in which the primary EA fails after receiving the reply from the QE, but before the reply 40 is successfully received by the client. Operation is similar to that of FIG. 4 until the failure of the primary is detected, wherein the backup EA steals the TCP connection and re-sends the reply to the client 42. The connection is terminated by the client 44.

In a preferred embodiment, two schemes are implemented for choosing QE's to balance the load on the EA's: In the first scheme, QE's are chosen in a round robin fashion, to distribute the load evenly. In the second scheme, each EA keeps track on how many pending requests it has issued to each QE, and chooses the QE with the least number of pending requests. This scheme also serves as a natural failure detector for the system; failed QE's do not send replies, and are therefore perceived by the system as overloaded, wherein the EA's direct new requests to other QE's.

The following description uses terms of art of the Internet and Unix operating "system calls" and other such instructions/functions. Below, the TCP and IP (Internet protocol) are separated for discussion. It should be realized that the art often combines the two as TCP/IP and therefore the terms can be considered interchangeable.

More specifically, when a QE fails, the primary EA uses a failure detection mechanism based on response time outs of half the allotted time bound, but also including sending I-am-alive messages. If a QE that was assigned to handle a certain request does not respond, the primary EA reissues the request to another QE. In the case of "idempotent" requests (those requests that can be issued many times with the same effect), this time-out can be much faster than the system's failure detection time. By definition in this application example, it is permissible to issue more than one copy of an "idempotent" request, and therefore if the QE that was picked originally is just slow but not faulty, we can safely reissue the request to another QE.

Figure 6:
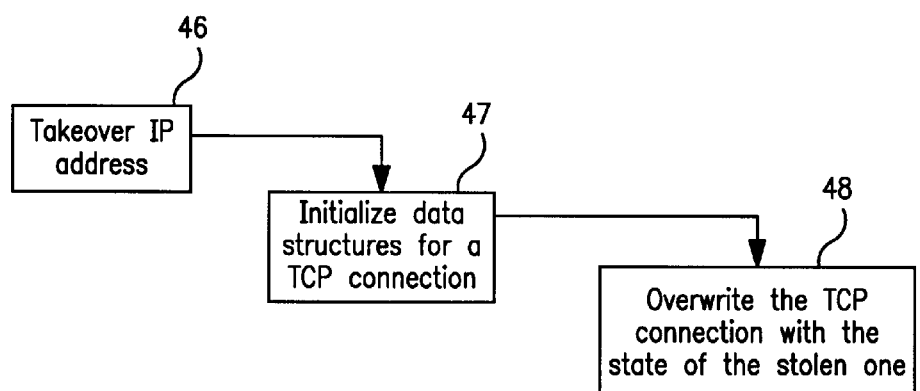
FIG. 6 is a flow chart of TCP connection stealing in accordance with the present invention.

Overcoming a failure of an EA in the case of a Web server is more complex. In order for the backup EA to take over successfully, it must transparently (so that the remote client does not realize that a failure occurred) steal the TCP connection and IP address (the entire TCP/IP) of the primary EA, as illustrated in FIG. 6. To guarantee smooth takeover of a TCP connection, whenever the backup EA notices that the primary has failed (by sharing the state of operation among the EA's and QE's), it must take the following actions: First, it has to take over the primary's IP address 46, and then create records of a TCP connection 47, 48, identical to the one that existed at the primary EA.

With reference to FIG. 6, in order to take over an IP (Internet protocol) address, the other computer/communication systems on the same subnetwork (a subnetwork is external to the present invention cluster), and in particular the router on that subnetwork, must route messages meant for the primary IP address to the backup's Ethernet address. The first time a machine, for example a router, needs to send a message to a given IP address, it broadcasts an ARP request. Other machines that know this translation, and were designated to publish it, reply to the request. After getting the reply, the router stores the translation in its ARP cache for future use. In order to change the way the router routes messages to a given IP address, a gratuitous ARP request is sent to update the stored IP address to the backup's address.

Note that this may not be enough if the router has never sent any message to the primary EA before that EA failed, or for some reason the router dropped the translation of the primary's IP address from its ARP cache, since gratuitous ARP requests only update caches that already have an entry for the IP address. To overcome this problem, the backup must instruct its ARP mechanism to reply to ARP translation requests for the primary's IP address. This is accomplished by calling the UNIX ARP system call and instructing it to add the above translation to the backup's ARP cache in a "permanent publish" mode. Both operations are required in order to takeover an IP address and such can be completed in about 67 milliseconds (average of 10 repetitions).

Next the TCP connection must be taken over by the backup. The backup must accommodate four important transitions in a TCP connection's state to successfully steal the TCP connection. These transitions are a) the establishment of the connection, b) receiving a message, c) sending a message, and d) disconnection. Thus, the primary EA reads its state after the connection has been established, after receiving a message, and, just before sending a message, and sends its state to the backup EA. It must also notify the backup EA when the connection has been terminated. Note that this is sufficient for HTTP, because of the non-interleaving way in which HTTP sends requests and replies. That is, the server does not start sending the reply until the entire request was received, and the client does not send a new request on the same connection until it receives the entire reply.

When the backup steals a TCP/IP connection, it has updated information about the last significant change in the state of the TCP connection, and therefore can create an entry in its own implementation of TCP that looks exactly like the one held by the primary. In particular, this scheme makes use of the fact that TCP at the client keeps track of sequence numbers for packets sent or acknowledged, and can transparently discard duplicate messages. This provides a convenient way to handle a scenario in which part of the reply was already sent by the primary EA before it failed. In this case, the state of TCP at the backup EA, when the backup EA starts sending the reply, is identical to the state of TCP/IP at the primary EA just before the primary EA started sending the reply. Thus, since the backup EA sends exactly the same reply, TCP/IP at the client's side filters out the bytes it has already received from the primary EA, assuming they are duplicates.

To actually create a TCP/IP entry, which is similar to the one held by the primary EA, the backup first creates a TCP connection to itself. This initiates all the necessary structures in the kernel's (the heart of the operating system) memory for a TCP connection. At that point, the backup EA simply overwrites the connection it just created to itself, with the state of the connection it wishes to steal as described below. It is important to note that this solution does not modify the kernel's code, allowing the kernel to do all necessary memory allocations by itself, so it is the least intrusive method. This technique allows this preferred embodiment to rapidly develop the TCP connection-stealing code. In another preferred embodiment a pre-allocated pool of connection descriptors is held in the kernel to hold the stolen state.

In a further preferred embodiment, a special device driver is written that can read and overwrite a TCP connection state, based on the unique connection id, which is a local IP address, local port, foreign IP address, and foreign port. Communication with the device driver is accomplished using the UNIX ioctl system call. In a read request, the connection id is passed to the device driver that returns the connection's state. To overwrite a connection, the id of the connection that should be overwritten, as well as the state of the stolen TCP connection are passed to the device driver. The device driver then looks for the appropriate record in the list of the TCP based inpcb records, finds the requested connection, and overwrites it. In yet another preferred embodiment, a module that reads and writes to the UNIX file /dev/kmem could be used. Finding the right TCP connection may require scanning several inpcb records, and each read or write to /dev/kmem involves a separate system call.

Figure 7:
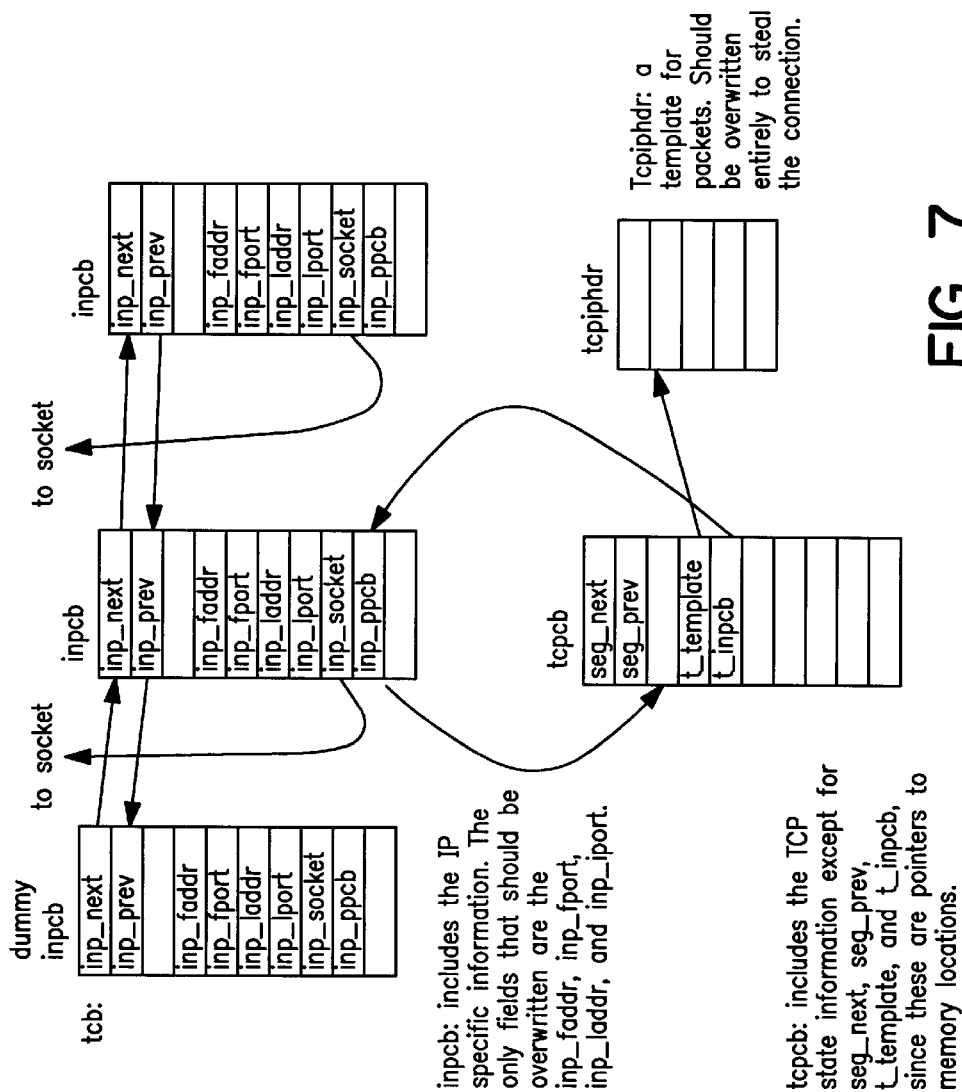
FIG. 7 is a more detailed chart of connection TCP stealing in accordance with the present invention.

With reference to FIG. 7, details of the overwriting of the TCP in a preferred embodiment are described in terms of art associated, especially with UNIX.

The implementation described here is based on BSD UNIX compatible stacks (memory locations). In these stacks, the information about a TCP connection is divided among three different structures: inpcb, which contains the IP level information regarding the connection, tcpcb, which includes the TCP specific state, and tcpiphdr, which is a template structure for packets sent over this connection. The inpcb structures are held in a doubly linked list, which starts with the kernel's tcb variable. Each inpcb includes a pointer called in_ppcb, to the corresponding tcpcb structure, and the tcpcb structure holds a pointer, called t_inpcb, back to the inpcb structure and a pointer, t_template, to the tcpiphdr structure. Thus, when reading a connection's state, all three structures are read, and are sent from the primary to the backup.

For overwriting a TCP connection, every field which is not a pointer in the corresponding three structures that represent the connection must be overwritten. Pointers should not be overwritten, since they point to memory locations in the machine that held the connection originally, and do not represent legal addresses in the backup machine. In the case of the inpcb structure, this means overwriting only the inp_laddr, inp_lport, inp_faddr, and inp_fport fields; in tcpcb, everything but the t_inpcb, t_template, seq_next, and seq_prev should be overwritten; the tcpiphdr structure must be entirely overwritten.

Secure communications is becoming common on the Internet and the present invention accommodates and supports the encryption/decryption techniques commonly used in the art. One such technique is the Secure Socket Layer (SSL) which is a common security feature for Web transactions (the HTTPS protocol), and therefore any Web server should support it. A preferred embodiment of the present invention can be extended to support SSL in a natural way. Whenever a TCP connection is established, and whenever the cipher is changed, the cipher information can be sent to the backup EA. Then, whenever the backup EA needs to steal a TCP connection from the primary EA, it installs the secured sockets with the information it has received from the primary EA about the cipher used for this connection.

Similarly, the security architecture called IPv6 includes support for both authentication and encryption. The information regarding the keys and protocols used for this security architecture are stored in the inpcb structure. A preferred embodiment the present invention can read and send this information in any case allowing the security architecture of IPv6 to be accommodated by the present invention.

These encryption/decryption measures do not violate the security principles of the network's architecture. Authentication and privacy are meant to prevent unauthorized parties from listening to communication, and to verify that the source of a message is really who it claims to be. However, given that both the primary and the backup EA's are part of the same server, if one of them is allowed to read the information, so is the other. Also, as far as the client is concerned, it is still talking with the same server, even though the messages may now be routed to a different machine that represents the same server. In particular, a client is only interested in knowing that it is talking with the server of a specific organization, but does not care which machine is running the server.

Figure 8A:
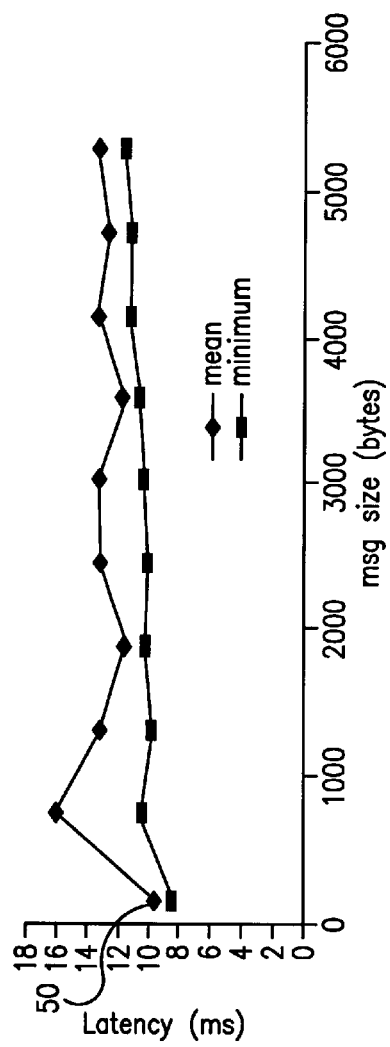
FIG. 8A graphically represents performance measurements taken with the present invention.
Figure 8B:
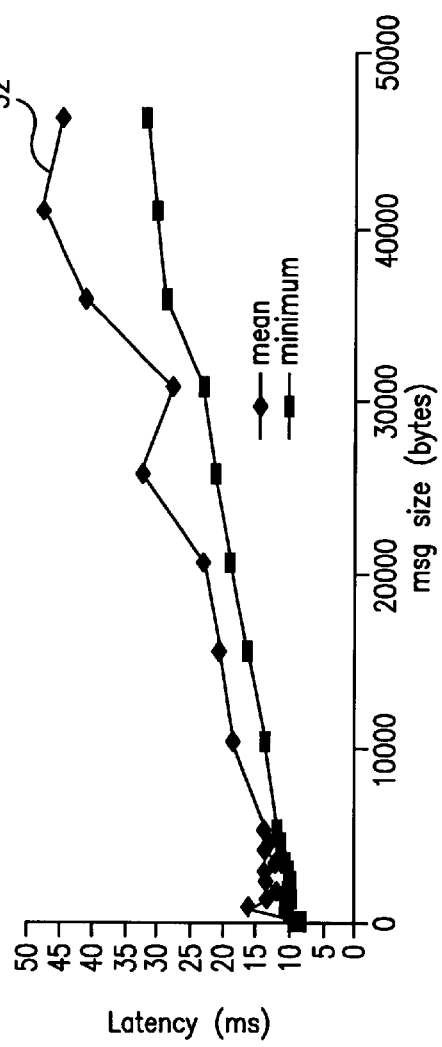
FIG. 8B graphically represents performance measurements taken with the present invention.
Figure 9:
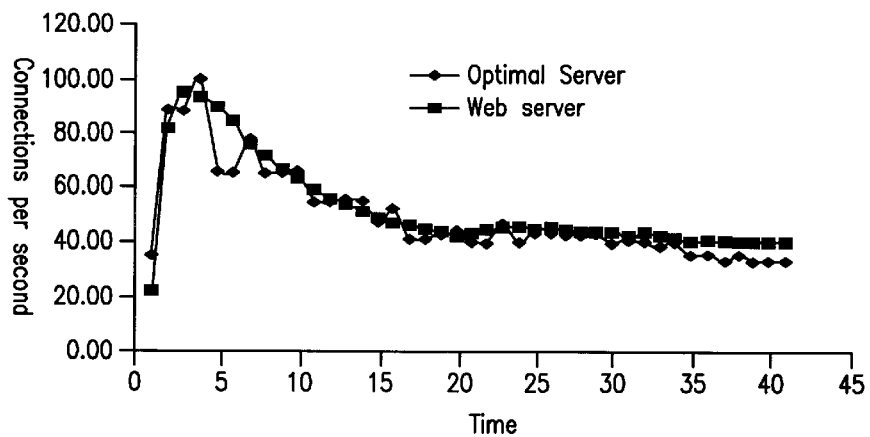
FIG. 9 graphically represents performance measurements taken with the present invention.

Performance measurements on the Web server example are shown in FIG. 8A, FIG. 8B and FIG. 9. These data were taken using a cluster of four Sparc 10s, 2 EA's and 2 QE'S, running the operating systems SunOS 4.1.3. Internal communication between the EA's and QE'S was performed over an ATM network using the U-Net network interface [VBBV95]. Clients were connected to the EA using the HTTP protocol over TCP, via a 10 Mbps Ethernet. The results of these measurements are reported below.

With reference to FIGS. 8A and 8B, the latency of the distributed Web server, as a function of the size of the reply was measured. That is, the time was measured from when an EA receives the first part of a client's request until it starts sending the reply. This includes the following: a) setting the necessary data structures to keep track of the connection at the EA, b) reading the TCP state at the primary EA and sending it to the backup EA, (c) forwarding the request to the QE, c) the time it takes the QE to read the file from disk, and d) sending the file back to the EA. In this case, the client was a Netscape browser.

The results of this experiment are shown in FIGS. 8A and 8B. As can be seen, the latency grows roughly linearly with the size of the replies, starting at 9 milliseconds 50 for short replies of about 150 bytes, to about 45 milliseconds 52 for 45,000 bytes. Also note that there are small humps whenever an 8 KB boundary is crossed. The reason for this is that the maximum transfer unit used for communication inside the server was 8 KB, so crossing this boundary means sending one more internal message. Given the fact that these numbers include access time to the disk, it can be concluded that the overhead for the internal communication inside the distributed server is reasonable from the point of view of the client.

The next parameter measured was the maximum sustainable throughput at the EA's. The BAS often limits the throughput in a system, since they have to forward the request from the client to the QE'S and back. Besides, even if servicing a request at a QE takes a long time, QE's can be added. This experiment was set up as follows: Several clients were designated to issue HTTP requests back to back. That is, whenever a reply to a previous HTTP request was received, a client would close the connection, wait a short time, and issue a new request on a new TCP connection. By having several such clients, the experiment simulates a scenario in which many users are trying to access data simultaneously from a single Web server. All clients were connected to the server using a 10 Mbps Ethernet.

Also, as a point of reference for the results, an optimal server was analyzed. The optimal server accepts a TCP connection, reads a short message from it, sends a short reply, and then closes the connection. It was also implemented using the select system call, so that several connections could be open at the same time, and the operations on each connection could be interleaved. Thus, the optimal server does not do any real work with the data, nor does it consume any time to calculate a reply, which is why it can be considered optimal.

FIG. 9 illustrates the results of submitting both the distributed server and the optimal server to a large number of HTTP requests, as described above. The graph results are an average of three experiments. As can be seen, the throughput of both servers rises rapidly over time, peaks around 100 connections per second, then dwindles down to 33 in the case of the optimal server, and to 40 in the case of the distributed server (40 requests per second translate into 144,000 requests per hour). This behavior can be attributed to the way TCP is implemented in SunOS kernels. In these kernels, the information regarding TCP connections is held in a linked list. Thus, each operation on a TCP connection involves scanning this list. Furthermore, in order to handle TCP timers, the list is also scanned on a regular basis. Thus, as the number of TCP connections grows, so does this list, meaning that each operation on a TCP connection becomes more time consuming. The result is reduced throughput, as can be seen in FIG. 9. Other newer operating systems, like NT 4.0 from Microsoft and Solaris 2.6, provide more efficient data structures that are likely to yield better results.

The reason the distributed server gives better throughput the the optimal server is that a distributed server does more work, and therefore accepts fewer concurrent TCP connections. This results in faster handling of each on the existing connections, and an overall better throughput measured by counting the number of replies per second.

Figure 10:
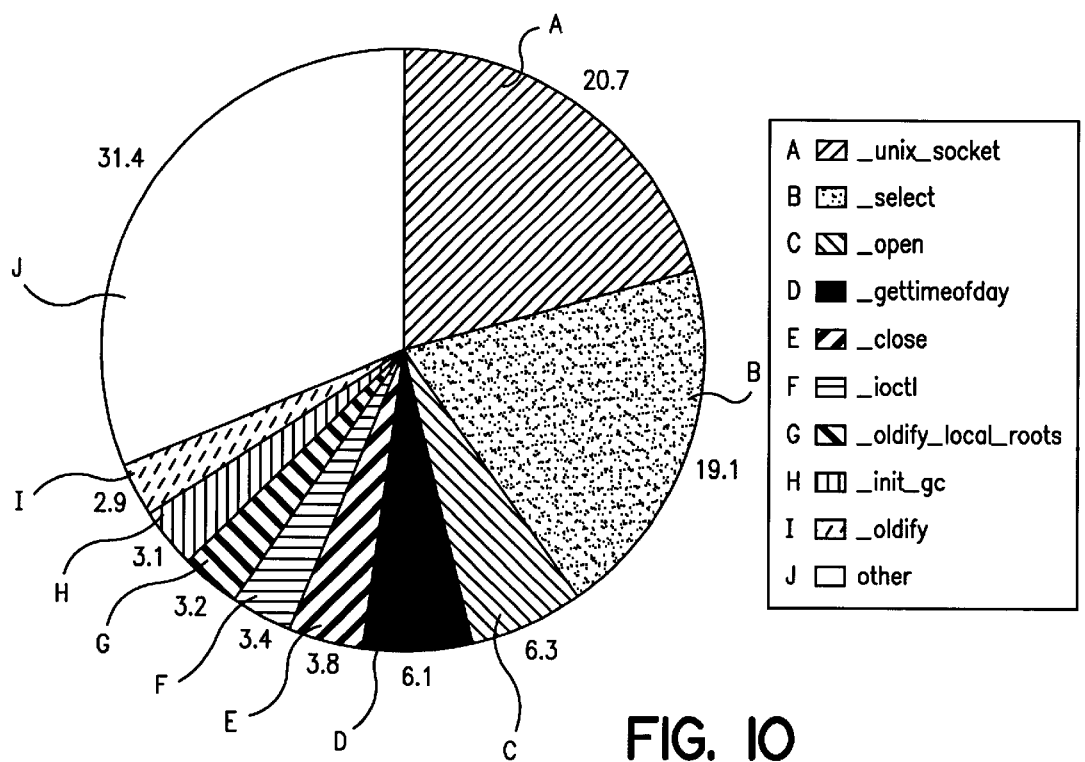
FIG. 10 is a pie chart of the EA's time spent on various tasks.

The above preferred embodiment solution is useful for servers whose main task is to process long CGI (common gateway interface) scripts, e.g., for computing predicted exchange rates between currencies over a six month period, or servicing inquiries that require scanning several hundreds of records in a database. For example, if the average CGI script in these cases takes about 200 milliseconds to complete, the system would be limited to 5 requests per second, while the current implementation (even on SunOS 4.1) can support over 40 requests per second. In this preferred embodiment, the EA's spend most of the time in system calls related to TCP connections, such as unix_socket, select, open, and close. FIG. 10 shows where the EA's are spending most of their time.

It is recognized that the select call is expensive and can be eliminated by polling. The functions oldify_local_roots, init_gc, and oldify are part of the overhead for maintaining all data structures and collecting those that are no longer needed, such overhead can become noticeable when the system must handle many connections per second. One approach to reducing this overhead is by moving the code of the EA into the kernel.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A cluster computing system comprising:

at least two external adapters (EA's), means for said EA's to communicate with each other and with a network, a plurality of query element computing systems (QE's), means for said QE's to communicate with each other, means for dividing the QE's into at least two sets of lists, wherein each QE appears only in one list within each set of lists, and wherein only one QE is common to a list from one set of lists and a list from another set of lists, and communication paths from said QE's to said EA's, wherein said communication paths conform to said lists such that each QE shares at least two communication paths to said EA's.

2. The cluster computing system as defined in claim 1 wherein said communication paths are arranged and defined, such that when one QE has failed, to provide and maintain communication paths between the EA's and functioning QE's.

3. The cluster computing system as defined in claim 1 wherein a specific QE appears in two lists within one set of lists, and wherein said communication paths are arranged and defined, such that when a QE fails, other than said specific QE, to provide and maintain communication paths between the EA's and -functioning QE's.

4. The cluster computing system as defined in claim 1 further comprising:

means for receiving requests from said network, means for collecting said requests into a first message for the QE's in one list, means for sending the first message to a first QE of that one list, wherein that first QE may modify the first message, means for sending the first modified or unmodified message to each successive QE in that one list, and wherein a last QE in that one list returns the first modified or unmodified message back to said means for sending the first message.

5. The cluster computing system as defined in claim 1 wherein said means for dividing comprises means for calculating the number of lists within a set of lists wherein said number of lists substantially equals the number of QE's within each list of said set of lists.

6. The cluster computing system as defined in claim 1 further comprising:
    means for deleting and adding QE's to said cluster computing system,
    means for deleting and adding EA's to said cluster computing system, and
    means for reconfiguring said sets of lists to reflect the added and deleted QE's and EA's.

7. The cluster computing system as defined in claim 1 further comprising:
    means for receiving requests from the network,
    means for assigning said requests to particular QE's in said lists,
    means for sending said requests to said particular QE's, wherein said particular QE's will generate a response to the requests, and
    means for setting a predetermined time for said response to be generated, such that when said predetermined time is reached and no response is generated, said cluster computing system further having means for sending said assigned request to a different QE.

8. The cluster computing system as defined in claim 1 further comprising:
    means for broadcasting to all the QE's, wherein said means for broadcasting is substantially reserved for control messages.

9. A cluster computing system comprising;
    at least two external adapters (EA's),
    means for connecting said EA's to each other and to a network,
    a plurality of query element computing systems (QE's), each in communication with each other and with the EA's,
    means for receiving requests from the network, said requests defining information relevant to said requests, and said requests requiring a response thereto,
    means for selecting one of said EA's as a primary respondent EA for each request received,
    means for the primary respondent EA to update a second EA, defined as a backup EA, with the information, said information sufficient for the backup EA to complete said response,
    means for the backup EA to detect a failure of the primary EA, and
    means for the backup SA to complete each said response.

10. The cluster computing system as defined in claim 9 wherein said means to update the backup EA comprises means for communicating that the primary respondent EA has completed the response.

11. The cluster computing system as- defined in claim 9 further comprising:
    means for establishing a TCP connection,
    means for collecting said requests into a message for sending to said QE's, and
    means for providing said request information as a header to said message, wherein said updating of the backup EA occurs each time the TCP connection is established, each time a message is received via the network, each time a response is sent and each time the TCP connection is closed.

12. The cluster computing system as defined in claim 11 wherein said means for updating of the backup EA comprises means for creating entries in the backup EA that correspond to the TCP connection and the state of TCP connection of the primary respondent EA.

13. The cluster computing system as defined in claim 9 wherein said primary and backup EA's have IP addresses, and
    wherein said means for updating the backup EA comprises means for sending particular requests to said EA's and QE's, wherein a response to said particular requests directs future responses to said backup EA's IP address.

14. The cluster computing system as defined in claim 13, wherein said particular requests are ARP requests.

15. A method for communicating between a network and a cluster computing system comprising the steps of:
    receiving requests from the network by at least two external adapters (EA's),
    communicating between said EA's,
    communicating between said EA's and query element computing systems (QE's),
    communicating among the QE's, dividing the QE's into at least two sets of lists, wherein each QE appears only in one list within each set of lists, and wherein only one QE is common to a list from one set of lists and a list from another set of lists, and
    selecting communication paths from said QE's to said EA's, wherein said communication paths conform to said lists such that each QE shares at least two communication paths to said EA's.

16. The method as defined in claim 15 further comprising the step of:
    providing and maintaining, when one QE has failed, communication paths between the EA's and the functioning QE's.

17. The method as defined in claim 15 further comprising the steps of enabling a specific QE to appear in two lists within one set of lists, and further comprising the step of providing and maintaining, when one QE other than said specific QE has failed, communication paths between the EA's and the functioning QE's.

18. The method as defined in claim 15 further comprising the steps of:
    receiving requests from the network,
    collecting said requests into a first message for the QE's in one list,
    sending the first message to a first QE on that one list, wherein said first QE may modify the first message,
    sending the first modified or unmodified message to each successive QE on that one list, and
    returning the first modified or unmodified message.

19. A method for connecting a cluster computing system to a network comprising the steps of:
    receiving requests from the network by at least two external adapters (EA's), said requests defining information relevant to said requests, and said requests requiring a response thereto,
    communicating between said EA's,
    communicating between said EA's and query element computing systems (QE's),
    communicating among the QE's,
    selecting one of said EA's as a primary respondent EA for each request received,
    said primary respondent EA updating a second EA, defined as a backup EA, with the information, said information sufficient for the backup EA to complete said response, detecting a failure of the primary EA, and completing said response by the backup EA.

20. The method as defined in claim 19 further comprising the steps of:

establishing a TCP connection, collecting said requests into a message for sending to said QE's, and providing header information to said message, wherein said step of updating occurs each time the TCP connection is established, each time a message is received via the network, each time a response is sent and when the TCP connection is closed.

21. The method as defined in claim 20 wherein said step of updating comprises the step of creating entries in the backup EA that correspond to the TCP connection and the state of the TCP connection of the primary respondent EA.

22. The method as defined in claim 19 wherein said primary respondent and backup EA's have IP addresses, and wherein the step of completing said response comprises the step sending particular requests to said EA's and QE's, and responding to said particular requests redirects future responses to said backup EA's IP address.

23. The method as defined in claim 22, wherein said particular requests are ARP requests.

* * * * *